(12) United States Patent
Frank

(10) Patent No.: US 8,490,166 B2
(45) Date of Patent: Jul. 16, 2013

(54) IDENTIFYING A USER ACCOUNT IN A SOCIAL NETWORKING SYSTEM

(75) Inventor: Jonathan H. Frank, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 111 days.

(21) Appl. No.: 12/981,445

(22) Filed: Dec. 29, 2010

(65) Prior Publication Data

US 2012/0174203 A1   Jul. 5, 2012

(51) Int. Cl.
*H04L 29/06* (2006.01)
(52) U.S. Cl.
USPC .............................................. 726/6; 380/286
(58) Field of Classification Search
USPC ................................ 380/286; 726/5, 6, 18, 28
See application file for complete search history.

(56) References Cited

U.S. PATENT DOCUMENTS

| | | | | |
|---|---|---|---|---|
| 6,141,423 | A | * | 10/2000 | Fischer ........................ 380/286 |
| 2010/0293600 | A1 | * | 11/2010 | Schechter et al. ................ 726/4 |
| 2011/0107400 | A1 | * | 5/2011 | Shankaranarayanan et al. . 726/4 |

* cited by examiner

*Primary Examiner* — Edward Zee
(74) *Attorney, Agent, or Firm* — Fenwick & West LLP

(57) ABSTRACT

Locating social networking system accounts for user of the social networking system permits the users to locate and access their accounts even if they cannot provide a user login ID or a login email address associated with their social networking system account. The social networking system locates a user account by receiving a user name associated with the user and a friend name of a friend connected to the user in the social networking system and identifying a user account wherein the identified user account has a user name matching the received user name and the identified user account is connected with another user in the social networking system who has a user name matching the received friend name.

22 Claims, 5 Drawing Sheets

IDENTIFYING A USER ACCOUNT IN A SOCIAL NETWORKING SYSTEM

BACKGROUND

This invention relates generally to social networking, and more specifically to using the data contained within a social networking system to locate a user's account.

Social networking systems typically permit users to log into the social networking system by enabling a user to provide a login email address or an account name and a password. Users can create a login identification name (or, "login ID") and set an accompanying password when creating a social networking system account. The user can then use the same login ID and password to log into and access the social networking system subsequently. In other instances, the user may not be required to create a login ID. For example, a user may provide his or her email address and an associated password when creating a social networking system account. The user may then be required to enter the email address and the associated password to subsequently access his or her social networking system account. However, users can forget their login ID, their login email address, or their password and thus may not be able to access their social networking system account.

To assist a user who has forgotten his or her login information, the social networking system may require the user to submit a recovery email address or a recovery phone number when creating a social networking system account. To recover the account, the social networking system typically sends the user account's login ID, login email address, or password to the recovery email address or phone number. For example, the social networking system can send an email to the recovery email address or a SMS message to the recovery phone number. The user then accesses his or her recovery email account or phone number to recover the login information sent by the social networking system. Disadvantageously, this method of recovering user login information does not enable account recovery for a user who has forgotten or is no longer associated with his or her recovery email account for phone number. For example, if a user has forgotten the password for his or her recovery email account, or if the user's recovery email address or phone numbers have been deactivated, the user would not be able to access the login information sent by the social networking system.

SUMMARY

Embodiments of the invention locate social networking system accounts for the users of the social networking system. In one embodiment, the social networking system locates an account for a user who cannot log in to his or her social networking system account because the user cannot correctly provide his or her login ID or login email address and a password. In another embodiment, the social networking system locates a user account for a user who has to provide his login information to execute certain actions within the social networking system, to interact with social networking applications, receive help and support from the social network system's help desk, or to perform some other interaction with the social networking system.

In one embodiment, where a user cannot correctly provide his or her login information or password, the social networking system requests the user to provide the user's name and the name of a friend connected to the user within the social networking system. For example, the social networking system may provide a user interface with input fields where the user enters a user name associated with the user of the social networking system including the user's first and last names and a friend name including a friend's first and last name, wherein the friend is connected to the user within the social networking system. The social networking system performs a search within a database of user accounts to match the first and last names provided by the user with the first and last names of accountholders associated with each social networking system account. The social networking system identifies a social networking system account as the user's account if the first and last names of an accountholder matches the provided user's name, the first and last names of another accountholder matches the provided friend's name, and the two accounts are connected to each other within the social networking system.

If more than a threshold number of social networking system accounts match the names provided by the user, the social networking system may prompt the user to provide the first and last names of another friend associated with the user within the social networking system. The social networking system may perform additional searches with additional user provided names to identify an account wherein he first and last names of an accountholder matches the provided user names, the first and last names of another accountholder matches the provided friend names, and the two accounts are connected to each other within the social networking system.

In one embodiment, the social networking system displays the identified account's publicly available information to the user. Publicly available information may include a profile picture associated with the user account, residence information, social networks associated with user account, or any other information that may be used to identify the user. Additionally, the social networking system may provide user interface fields wherein the user can enter a password associated with his or her social networking account to log in to the social networking system. The user can verify whether the identified account and the displayed publicly available account information are associated with the user's social networking system account. If the displayed account information correctly identifies the user's social networking account, the user can enter his or her social networking system password in the provided user interface to log into his or her social networking system account.

The embodiments presented herein allow a social networking system to identify and locate a user's social networking system account without having to send any additional email or SMS message to a recovery email account or a recovery phone number associated with the user. Recovery email addresses and phone numbers are generally not a reliable way to notify the user of his or her login information. For example, the user can discontinue using the recovery email or phone without notifying the social networking system. In another example, the user may forget the recovery email address, the recovery phone number, or a password associated with the recovery email or phone account. In yet another example, the user may have mistyped his or her recovery email address or phone number while creating a social networking system user account. Thus, the user may be unable to access any recovery information sent by the social networking system for any number of reasons. The embodiments presented herein provide a reliable method of locating a user's social networking system account.

DETAILED DESCRIPTION

Overview

A social networking system offers its users the ability to communicate and interact with other users of the system. In use, users join the social networking system and then add connections to a number of other users to whom they desire to be connected. In addition to interactions with other users, the social networking system provides users with the ability to take actions on various types of items supported by the system.

Users can join a social networking system by creating a social networking system account. Each user's account can include user profiles that describe the users of the social network, including biographic, demographic, and other types of descriptive information, such as work experience, educational history, hobbies or preferences, location, and the like. When creating a social networking system account, a user may provide login information, such as a login email address or a login ID and a password. In one embodiment, the provided login information must be used by the user to sign into and access the social networking system for subsequent sessions between the user and the social networking system. Embodiments of the invention provide a solution for when the user has forgotten the user's login information.

Figure 1:
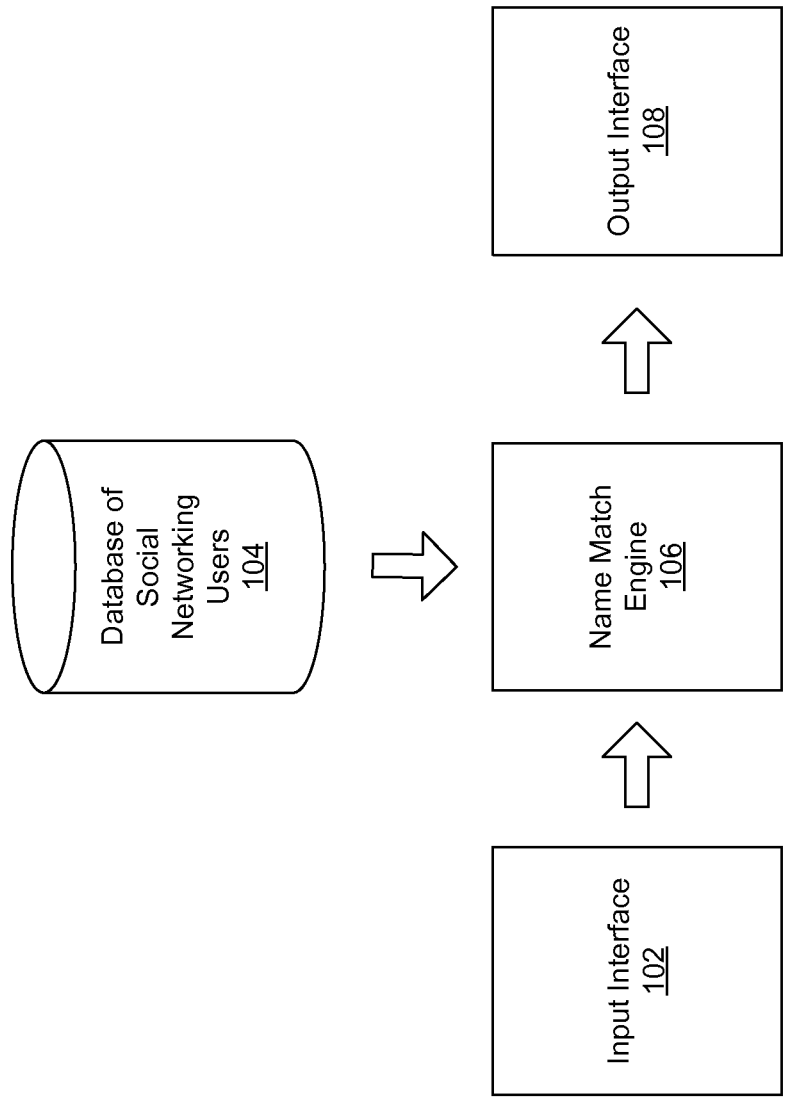
FIG. 1 is a diagram of a system for locating user accounts within a social networking system, in accordance with an embodiment of the invention.

FIG. 1 illustrates a system for locating user accounts within a social networking system, in accordance with an embodiment of the invention. FIG. 1 illustrates an input interface 102, a database of social networking users 104, a name match engine 106, and an output interface 108. In one embodiment, the social networking system locates a user's social networking system account for a user who has lost his or her account information. This process may begin when the social networking system receives a request for login information associated with a social networking system account. For example, a user may request his or her social networking system account information if the user cannot log into and access his or her account, if a help desk technician associated with the social networking system needs the user's login information to assist the user with a technical issue, or for any other reason when the user needs to locate the user's account information.

In an embodiment, a user requesting his or her social networking system login information is presented with an input interface 102. The input interface 102 allows a user to enter a user name associated with the user's social networking account and a friend name of a friend of the user who is connected to the user in the social networking system. In one embodiment, the user interface may request a user to enter a full user name including a first and last name of the requesting user and a full friend name including a first and last name of friend connected to the user within the social networking system. Users may connect to each other within the social networking system by becoming friends with a user within the social networking system, being a part of a same social network, interacting with each other by using a social networking application, etc.

In one embodiment, a name match engine 106 identifies one or more user accounts that match the first and last names provided by the user by performing a search in a database of social networking users 104. A database of social networking users 104 includes an account holder name for each social networking system account. If a requesting user provides 'John Smith' as the user's first and last name respectively, and 'Jane Doe' as the first and last names of a friend connected to the user within the social networking system, the name match engine 106 identifies a social networking system account within a database of social networking users 104 where the account holder's name is John Smith and the account is connected to another account whose account holder name is Jane Doe.

The social networking system generates an output interface 108 that displays the one or more matching user accounts. In one embodiment, the output interface 108 displays identifying information for the one or more matching user accounts, such as a picture of the user. This information enables the user who is viewing the output interface 108 to select one of the matching accounts that belong to the user.

In one example, the output interface 108 includes the requesting user's retrieved login information and a profile picture. The requesting user verifies whether the identified and displayed social networking system account is the user's account based on the profile picture and the login information displayed. The output interface 108 may also allow the user to enter his or her social networking system password. Thus, a user can access his or her identified social networking system account without having input a login ID or a login email address.

In one embodiment, the output interface 108 includes input fields requesting a user to enter first and last name of another friend connected to the user within the social networking system. For example, if several user accounts match the user's name and the user's friend's name provided by the user, the social networking system may not be able to disambiguate to locate the user's account. In such a case the social networking system may request an alternative friend name to identify the requesting user's account. As described in greater detail below, the name match engine 106 may perform another search within the database of social networking users 104 to identify a user account, where the user name provided by the requesting user matches an account holder name of a social networking system account and the friend name provided by the requesting user matches a account holder name of another account connected to the user account within the social networking system.

System Architecture

Figure 2:
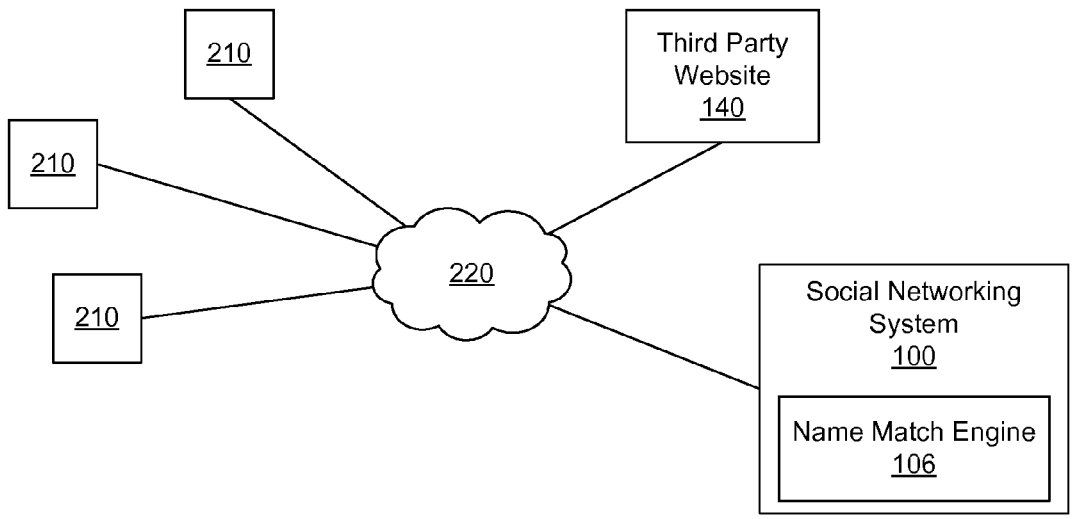
FIG. 2 is a network diagram of a system for locating user accounts within a social networking system, in accordance with an embodiment of the invention.

FIG. 2 is a high level block diagram illustrating a system environment suitable for operation of a social networking system 100. The system environment comprises one or more client devices 210, one or more third-party websites 240, a social networking system 100 and a network 220. In alternative configurations, different and/or additional modules can be included in the system.

The client devices 210 comprise one or more computing devices that can receive member input and can transmit and receive data via the network 220. For example, the client devices 210 may be desktop computers, laptop computers, tablet computers (pads), smart phones, personal digital assistants (PDAs), or any other device including computing functionality and data communication capabilities. The client devices 220 are configured to communicate via network 220, which may comprise any combination of local area and/or wide area networks, using both wired and wireless communication systems. The third party website 240 may be coupled to the network 220 for communicating messages to the social networking system 100 about the users' actions off the system 100.

Figure 3:
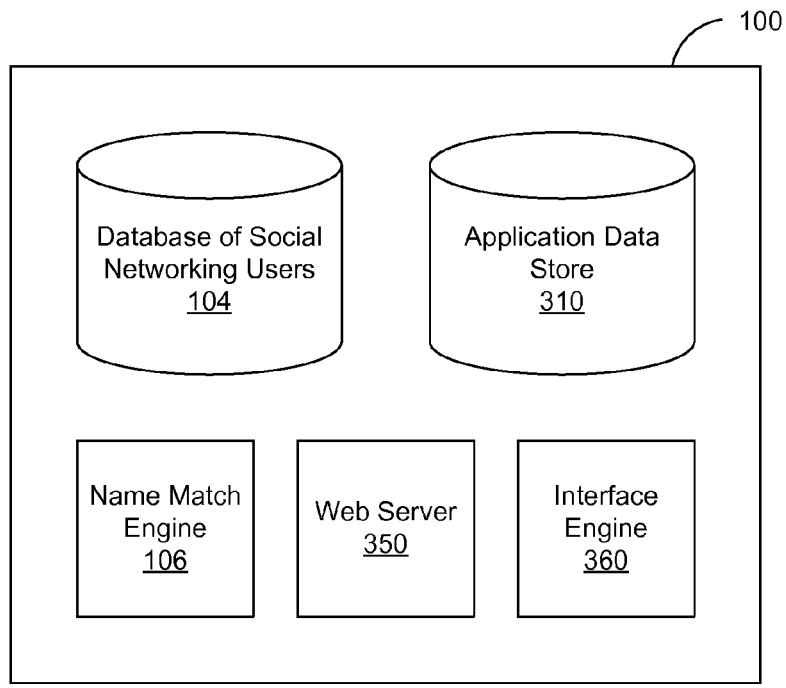
FIG. 3 is a block diagram of a social networking system, in accordance with an embodiment of the invention.

FIG. 3 is a block diagram of an embodiment of a social networking system 100. The social networking system 100 includes a web server 350, an application data store 310, a name match engine 106 and an interface engine 360. In other embodiments, the social networking system 100 may include additional, fewer, or different modules for various applications.

The web server 350 links the social networking system 100 via the network 220 to one or more client devices 210, as well as to one or more third party websites 140. The web server 350 may include a mail server or other messaging functionality for receiving and routing messages between the social networking system 100 and the client devices 210 or third party websites 140. The messages can be instant messages, queued messages (e.g., email), text and SMS messages, or any other suitable messaging technique. Additionally, the web server 350 links the social networking system 100 to client devices 210 wherein the client devices can be used to log into the social networking system by using an application executing on the mobile device 210 or by using a web browser executing on the mobile device 210.

In one embodiment, the application data store 310 includes information about one or more applications associated with the social networking system. Applications associated with the social networking system can include interactive games, news, videos, etc. A social application can request a user's login information associated with the social networking system to permit a user to use the application. In such an instance, a user logged into the social networking system may be required to provide his or her login information to access a social networking system application.

The database of social networking users 104 includes login information and account holder name for each social networking account. In another embodiment, the database of social networking users 104 can include an identification of other social networking system accounts connected to each social networking system account. Account can be connected to each other within the social networking system if the users of the account accept another user's invitation for a connection, the users are part of a same social network within the social networking system, or any other way for explicitly or implicitly indicating an association between users of a social networking system. In one embodiment, the social networking system requires a user to provide a first and last name of the accountholder or the user when creating a social networking system account. The user can update his or her first and last name subsequent to generating the social networking system account. As described above, the social networking system also requires a user to provide login information, including but not limited to a login email address, a unique login user ID, etc. Thus, the database of social networking users 104 includes at least the login information, an account holder's first and last name associated with each social networking system account, and the connections between or among the accounts within the social networking system.

The name match engine 106 identifies a social networking system account that matches the user name provided by the requesting user and is connected to another social networking account that matches the friend name provided by the requesting user.

The interface engine 360 generates a user interface that displays information about the identified social networking system account. As described in greater detail in the specification, the generated user interface may include publicly viewable information associated with the identified social networking system account. This information gives the user feedback about whether the social networking system has correctly located the user's account. Publicly viewable information may vary based on the privacy settings of each social networking system account. For example, users may choose which social networking system account information is publicly viewable, including messages generated by the user, photos of or posted by the user, videos of or posted by the user, etc. In one embodiment, the interface includes a user input field in which the user can enter a password associated with the identified social networking system account.

In one embodiment, the name match engine 106 identifies more than one social networking system account that matches the user names and the friend names provided by the social networking system. In such an embodiment, the interface engine 360 generates a user interface displaying information for the several matched accounts if the number of matches is below a threshold number. The threshold number can be arbitrarily set by the social networking system. Thus, if a threshold number is ten matches and the name match engine 106 identifies ten or fewer accounts matching the user name and friend name provided by the user, the interface engine 360 generates a user interface displaying the ten or fewer matching social networking system accounts. In such an instance, if the name match engine 106 identifies more than ten social networking system accounts matching the user provided names, the interface engine 360 generates a user interface requesting a name of another friend connected to the user within the social networking system. The user interface can include input fields wherein the user can enter the first and last name of another friend connected to the user within the social networking system. The user interface can also display a message stating that more than one social networking account matches the names provided by the user and request the user to provide a name of another friend connected to the user within the social networking system.

Method of Identifying User Accounts

Figure 4:
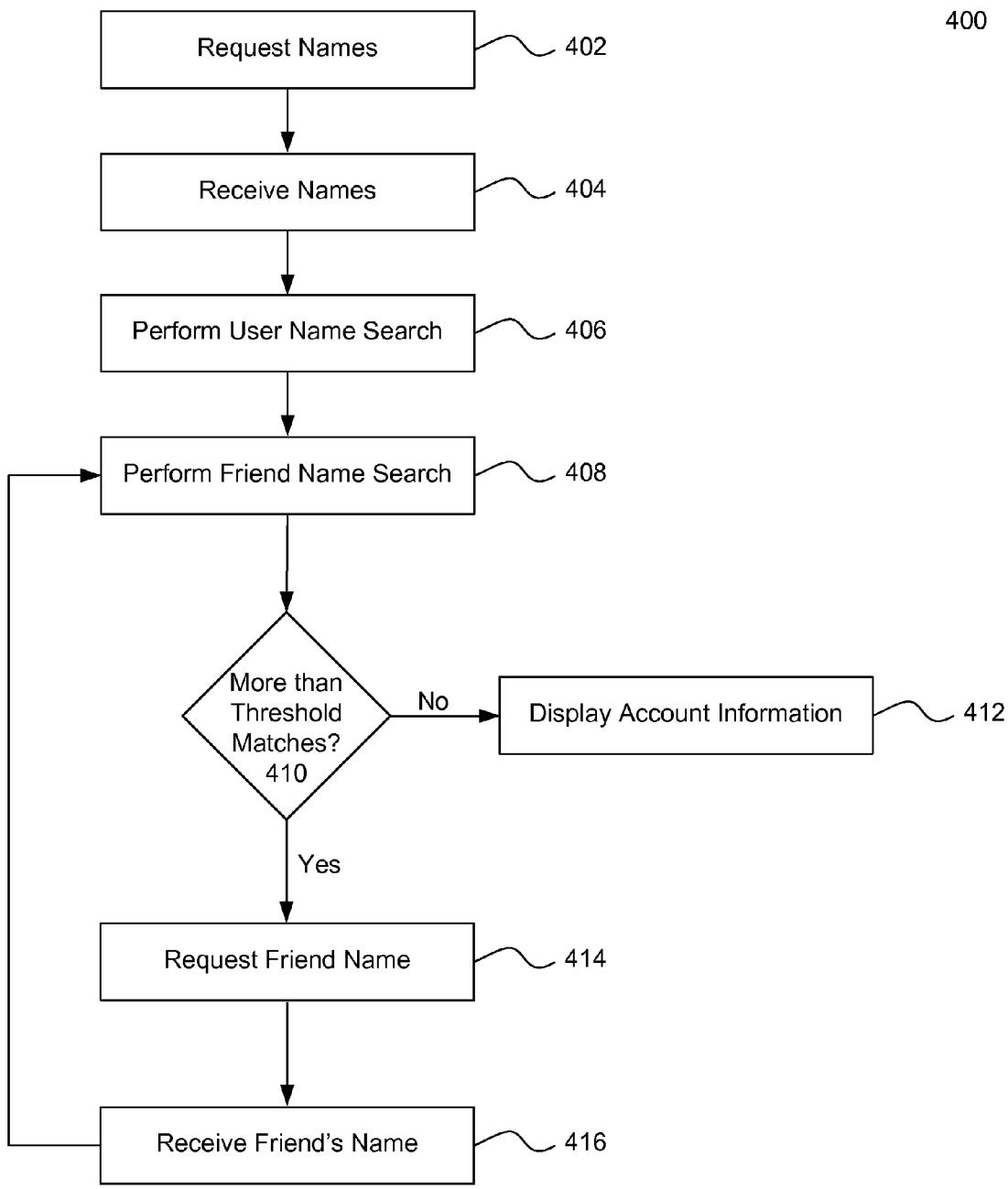
FIG. 4 is a flow chart of a process for locating user accounts within a social networking system, in accordance with an embodiment of the invention.

FIG. 4 illustrates an embodiment of a process 400 for identifying user accounts. In one embodiment, the social networking system initiates the process 400 responsive to a user requesting his or her login information. In another embodiment, the social networking system initiates the process 400 if the user has failed one or more login attempts to access his or her social networking system account.

Figure 5:
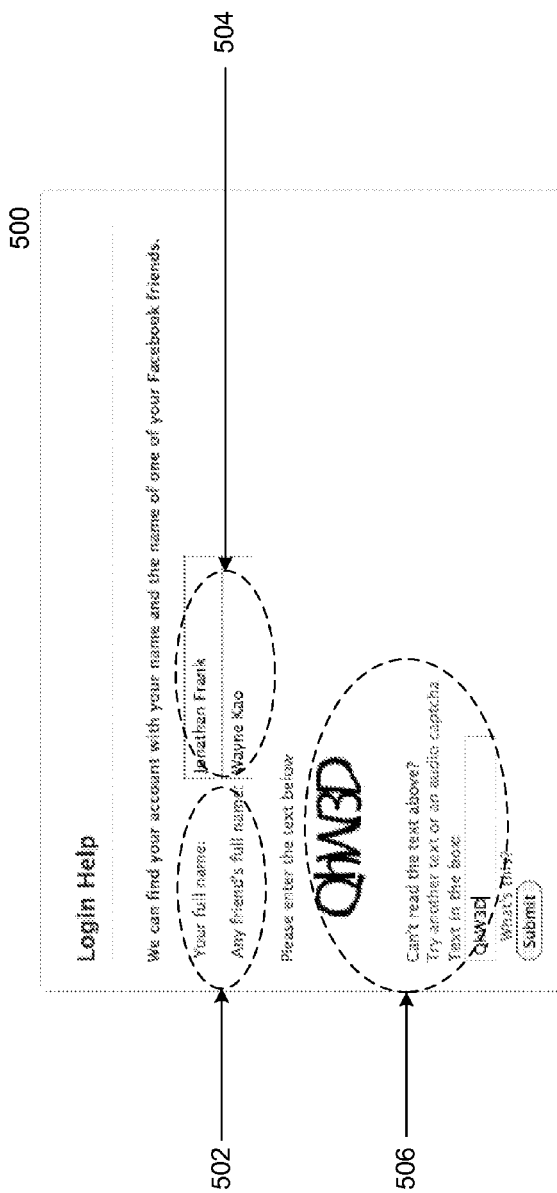
FIG. 5 is a user interface requesting a user to provide the user's name and a friend's name to locate the user's account, in accordance with an embodiment of the invention.
Figure 6:
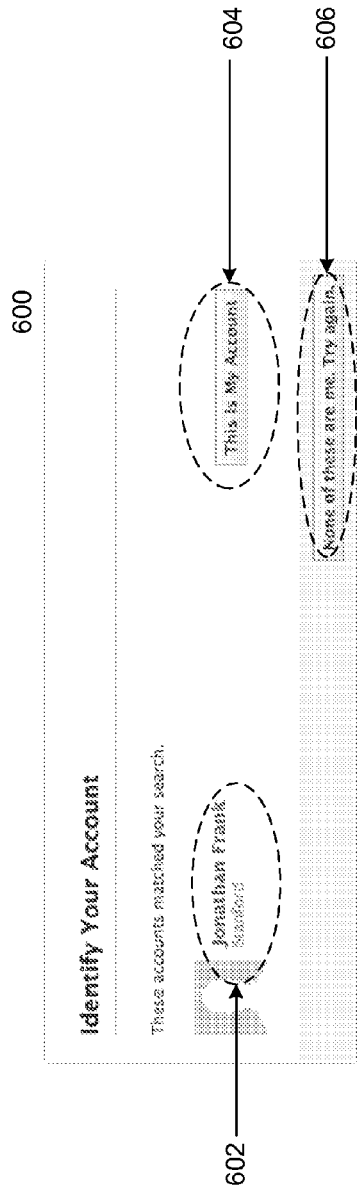
FIG. 6 is a user interface displaying one or more social networking accounts matching names provided a user, in accordance with an embodiment of the invention.
Figure 7:
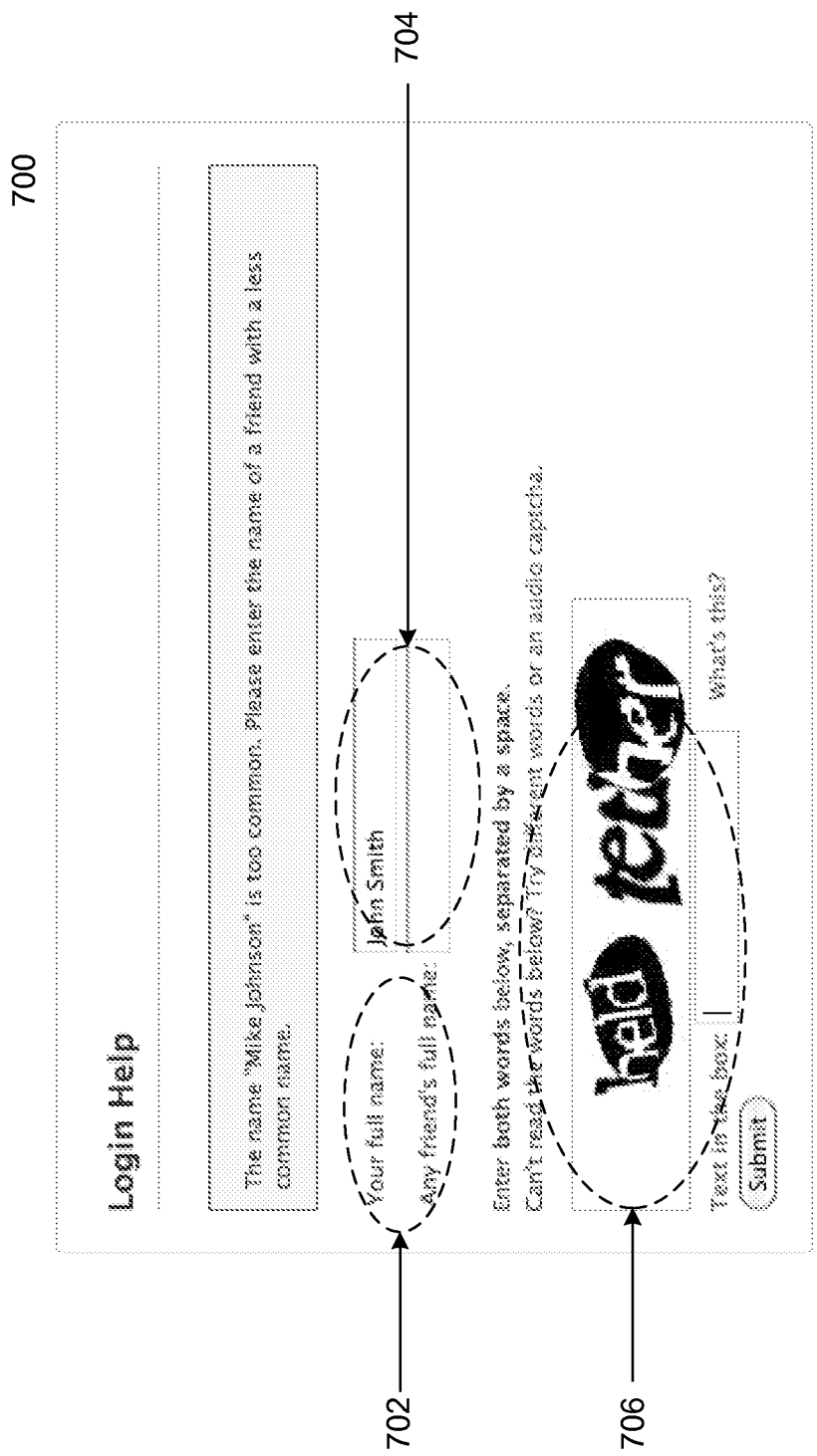
FIG. 7 is a user interface requesting a user to provide a name of a friend connected to the user in the social networking system to locate the user's account, in accordance with an embodiment of the invention. The figures depict various embodiments of the present invention for purposes of illustration only. One skilled in the art will readily recognize from the following discussion that alternative embodiments of the structures and methods illustrated herein may be employed without departing from the principles of the invention described herein.

FIGS. 5, 6 and 7 illustrate exemplary user interfaces displayed to users of the social networking system to locate the users' social networking system accounts, in accordance with an embodiment of the invention. For the purposes of discussion below, FIGS. 4-7 are discussed concurrently.

In one embodiment, the social networking system requests 402 a user's information associated with his or her social networking system account. The requested user information includes the first and last name of the user and the first and last names of a friend of the user who is connected to the user within the social networking system. In one embodiment, the social networking system requests 402 the user information by providing one or more input fields in which the user can enter his or her first and last name as well as the first and last name of the user's friend associated with the user within the social networking system.

An exemplary user interface requesting a user to input his or her name along with a friend's name to locate the user's social networking system account is illustrated in FIG. 5, in accordance with an embodiment of the invention. As shown in FIG. 5, the user interface is generated for a web page hosted by a social networking system. In one embodiment, the user interface 500 includes a display interface 502, an input interface 504 and a CAPTCHA interface 506.

The display interface 502 comprises text providing instructions explaining how a user can locate his or her social networking system account. The display interface 502 can display information such as 'Login Help', "We can find your account with your name and the name of one of your friends,' 'Your Full Name:,' "Any friend's full name:,' etc. In other embodiments, the display interface 502 can display other images or text. The input interface 504 provides user interface components wherein a user can enter his or her name and the name of a friend connected to the user within the social networking system. In one embodiment, the user interface components include two text boxes wherein a user can enter his or her name in one text box and the name of the user's friend in the other text box. The CAPTCHA interface 506 includes a display and input interface components. In one embodiment, the display interface component provides one or more images illustrating text. The input interface component provides a text box wherein the user can type the text illustrated by the one or more images.

In one embodiment, the social networking system receives 404 user names and friend names submitted by the user. As described in reference to FIG. 5, a user can submit the user names and friend names by interacting with a user interface 500 provided by the social networking system. The social networking accesses a database of user accounts that includes the first and last name of an account holder associated with each account. In one embodiment, the social networking system performs 406 a first search within the database to identify user accounts wherein the first and last name of the account holder match the first and last name received 404 from the user. These identified accounts are candidate accounts for the user's account.

The database of user accounts 105 also includes accounts of other users who are connected to the user account within the social networking system. Accordingly, the process 400 performs 408 a second search on the candidate accounts to identify any candidate accounts that are connected to another account whose first and last names match the user's friend's name received 404 from the user.

In this way, the process 400 identifies one or more social networking system accounts that fit the criteria of (1) having a user name that matches the provided user name, and (2) being connected to another user in the social networking system whose user name matches the provided friend name. In one embodiment, the process 400 determines the number of social networking system accounts that match the user names and friend names provided by the user. If the process determines 410 that fewer than a threshold number of accounts match the user names and friend names provided by the user, the process 400 displays 412 publicly viewable information of the one or more social networking system accounts that match the user provided information. The threshold number of matches can be any arbitrary number of matches the social networking system wants to display in a user interface display.

FIG. 6 illustrates a user interface generated by the social networking system to display one or more social networking accounts that match the user provided user name and friend name, in accordance with one embodiment of the invention. The user interface 600 includes a display interface 602 wherein the identified social networking system accounts are displayed to the user, an interface component 604 that allows the user to choose a displayed account as the user's account and an interface component 606 allowing a user to choose that none of the displayed accounts are the user's social networking account. Only one user account is illustrated as matching the user name and friend name provided by the user, for simplicity, however, more than one account can be displayed if several accounts match the user provided criteria.

Referring again to FIG. 4 if more than 410 a threshold number of accounts match the user names and friend names provided by the user, the process requests 414 the user to provide a first and last name of another friend connected to the user within the social networking system.

An exemplary user interface requesting a user to input a name of friend with a more unique name to locate the user's social networking system account is illustrated in FIG. 7, in accordance with an embodiment of the invention. The user interface 700 includes a display interface 702, an input interface 704 and a CAPTCHA interface 706. The display interface 702 provides information stating that the friend name entered by the user does not permit the social networking system to locate the user's account. Additionally, the display interface 702 requests the user to provide a name of another friend connected to the user within the social networking system. The input interface 704 includes one or more text boxes wherein a user can enter his or her user name and a name of a friend. In one embodiment, the text box associated with the user name includes the user name previously received 404 from the user. The CAPTCHA interface 706 includes a display and a user input interface components. In one embodiment, the display interface region provides one or more images illustrating text. The input interface component provides a text box wherein the user can type the text illustrated by the one or more images.

Once the user submits the names of another friend, the process 400 receives 416 the friend's name. In such an embodiment, the process 400 performs another friend name search 408 within the subset of users identified in the first search as matching the user's name with the account holder names. In one embodiment, the process continues as described above, until the process 400 displays 412 publicly viewable information of the matched social networking system account.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art.

These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving a request to identify a user account on a social networking system;
   receiving a user name associated with a user of the social networking system, wherein a plurality of user accounts in the social networking system are associated with the received user name;
   receiving a friend name of a friend of the user, the friend connected to the user in the social networking system;
   identifying a user account of the plurality of user accounts in which: the identified user account has a user name matching at least a portion of the received user name, and the identified user account is connected with another user in the social networking system who has a user name matching at least a portion of the received friend name; and
   displaying information that describes the user account that was identified.

2. The method of claim 1, wherein the request to identify a user account is initiated responsive to the user's attempt to access or recover a social networking system account.

3. The method of claim 1, wherein the received user name comprises the user's first and last names.

4. The method of claim 1, wherein the received friend name comprises the friend's first and last names.

5. The method of claim 1, further comprising:
   identifying more than one user account matching at least a portion of the received user name and wherein each identified account is connected with another user in the social networking system who has a user name matching at least a portion of the received friend name; and
   displaying information that describes the identified user accounts.

6. The method of claim 5, wherein information that describes the user account for one or more identified users is displayed if the number of identified accounts is no greater than a threshold number.

7. The method of claim 1, further comprising:
   identifying more than one user account matching at least a portion of the received user name and wherein each identified account is connected with another user in the social networking system who has a user name matching at least a portion of the received friend name; and
   requesting the user to provide a name of another friend of the user, the another friend also connected to the user in the social networking system.

8. The method of claim 7, wherein another friend's name is requested if the number of identified accounts is greater than a threshold number.

9. The method of claim 1, further comprising:
   identifying a first set of candidate user accounts, each user account's name matching at least a portion of the received user name;
   performing a search among other user accounts connected to the candidate accounts, the search identifying another user in the social networking system who has a user name matching at least a portion of the received friend name; and
   selecting a candidate user account connected to another user account whose user whose name matches at least a portion of the received friend name.

10. The method of claim 1, wherein the information that describes the user account identified comprises a picture provided by a user of the identified user account or a picture provided by another user in the social networking system who has a user name matching at least a portion of the received friend name.

11. The method of claim 1, further comprising:
    receiving a request to access the identified user account, the request accompanied by a password to access the social networking account; and
    granting the request to access the account if the received password matches the account's password.

12. A computer program product comprising a non-transitory computer-readable storage medium containing computer program code for:
    receiving a request to identify a user account on a social networking system;
    receiving a user name associated with a user of the social networking system, wherein a plurality of user accounts in the social networking system are associated with the received user name;
    receiving a friend name of a friend of the user, the friend connected to the user in the social networking system;

identifying a user account of the plurality of user accounts in which: the identified user account has a user name matching at least a portion of the received user name, and the identified user account is connected with another user in the social networking system who has a user name matching at least a portion of the received friend name; and displaying information that describes the user account that was identified.

13. The computer program product of claim 12, wherein the request to identify a user account is initiated responsive to the user's attempt to access or recover a social networking system account.

14. The computer program product of claim 12, wherein the received user name comprises the user's first and last names.

15. The computer program product of claim 12, wherein the received friend name comprises the friend's first and last names.

16. The computer program product of claim 12, further comprising a non-transitory computer-readable storage medium containing computer program code for:

identifying more than one user account matching at least a portion of the received user name and wherein each identified account is connected with another user in the social networking system who has a user name matching at least a portion of the received friend name; and displaying information that describes the identified user accounts.

17. The computer program product of claim 16, wherein information that describes the user account for one or more identified users is displayed if the number of identified accounts is no greater than a threshold number.

18. The computer program product of claim 12, further comprising a non-transitory computer-readable storage medium containing computer program code for:

identifying more than one user account matching at least a portion of the received user name and wherein each identified account is connected with another user in the social networking system who has a user name matching at least a portion of the received friend name; and requesting the user to provide a name of another friend of the user, the another friend also connected to the user in the social networking system.

19. The computer program product of claim 18, wherein another friend's name is requested if the number of identified accounts is greater than a threshold number.

20. The computer program product of claim 12, further comprising a non-transitory computer-readable storage medium containing computer program code for:

identifying a first set of candidate user accounts, each user account's name matching at least a portion of the received user name;

performing a search among other user accounts connected to the candidate accounts, the search identifying another user in the social networking system who has a user name matching at least a portion of the received friend name; and selecting a candidate user account connected to another user account whose user whose name matches at least a portion of the received friend name.

21. The computer program product of claim 12, wherein the information that describes the user account identified comprises a picture provided by a user of the identified user account or a picture provided by another user in the social networking system who has a user name matching at least a portion of the received friend name.

22. The computer program product of claim 12, further comprising a non-transitory computer-readable storage medium containing computer program code for:

receiving a request to access the identified user account, the request accompanied by a password to access the social networking account; and granting the request to access the account if the received password matches the account's password.

\* \* \* \* \*

UNITED STATES PATENT AND TRADEMARK OFFICE
CERTIFICATE OF CORRECTION

PATENT NO.         : 8,490,166 B2                                    Page 1 of 1
APPLICATION NO.    : 12/981445
DATED              : July 16, 2013
INVENTOR(S)        : Frank It is certified that error appears in the above-identified patent and that said Letters Patent is hereby corrected as shown below:

In the Claims

Column 12, line 22, Claim 20, after "account", delete "chose user whose name" and insert --whose user name--.

Signed and Sealed this

Eleventh Day of February, 2014

Michelle K. Lee
*Deputy Director of the United States Patent and Trademark Office*